United States Patent [19]

Zimmerman

[11] Patent Number: 4,473,161

[45] Date of Patent: Sep. 25, 1984

[54] FOOD RECEPTACLE FORMED AS INSULATED RECEPTACLE

[75] Inventor: Anso Zimmerman, Bad Hersfeld, Fed. Rep. of Germany

[73] Assignee: Anso Zimmerman Isolierflaschen, Niederaula, Fed. Rep. of Germany

[21] Appl. No.: 550,987

[22] Filed: Nov. 10, 1983

Related U.S. Application Data

[63] Continuation of Ser. No. 318,068, Nov. 4, 1981, abandoned.

[30] Foreign Application Priority Data

Nov. 20, 1980 [DE] Fed. Rep. of Germany ....... 3043826

[51] Int. Cl.³ ............................................. A47J 41/02
[52] U.S. Cl. .................................... 215/13 R; 220/420
[58] Field of Search ................. 215/1 C, 12 R, 12 A, 215/13 R, 277, 343, DIG. 7; 220/420, 425

[56] References Cited

U.S. PATENT DOCUMENTS

| | | | |
|---|---|---|---|
| 3,765,559 | 10/1973 | Savey et al. | 215/13 R X |
| 3,871,543 | 3/1975 | Chadfield et al. | 215/13 R |
| 4,006,835 | 2/1977 | Cummings | 215/13 R |
| 4,273,247 | 6/1981 | Earls | 215/DIG. 7 X |

FOREIGN PATENT DOCUMENTS

| | | | |
|---|---|---|---|
| 848254 | 8/1970 | Canada | 215/13 R |
| 640056 | 7/1950 | United Kingdom | 215/13 R |
| 1016815 | 1/1966 | United Kingdom | 215/13 R |
| 2033573 | 5/1980 | United Kingdom | 215/13 R |

Primary Examiner—William Price
Assistant Examiner—Sue A. Weaver
Attorney, Agent, or Firm—Scully, Scott, Murphy & Presser

[57] ABSTRACT

A food receptacle which is constructed as an insulated receptacle having a heat-insulating inner container and an outer shell member encompassing and retaining the container. The shell member consists of an upper shell portion and a base portion supporting the inner container from below with an internal insert cladding the inner container, which, extending above the upper rim of the inner container so as to enclose the latter is connected with the shell portion, as well as with fastening means for a receptacle closure consisting of a cover portion and a sealing insert which seals the upper opening of the inner container covered by the initial insert.

8 Claims, 7 Drawing Figures

FOOD RECEPTACLE FORMED AS INSULATED RECEPTACLE

This is a continuation of co-pending application Ser. No. 318,068 filed Nov. 4, 1981, now abandoned.

BACKGROUND OF THE INVENTION

1. Field of the Invention

The present invention relates to a food receptacle which is constructed as an insulated receptacle having a heat-insulating inner container and an outer shell member encompassing and retaining the container. The shell member consists of an upper shell portion and a base portion supporting the inner container from below, with an internal insert cladding the inner container, which, extending above the upper rim of the inner container so as to enclose the latter is connected with the shell portion, as well as with fastening means for a receptacle closure consisting of a cover portion and a sealing insert which seals the upper opening of the inner container covered by the initial insert.

2. Discussion of the Prior Art

Portable food receptacles of that type have been known for some time for maintaining foods warm or cool, in particular for trips, picnics and the like. The heat-insulating inner container in such receptacles consists of a double walled, evacuated and, if required internally mirrored glass member. The inner container is thereby relatively susceptible to mechanical damages, in particular in the utilization of a food receptacle of the above-mentioned type when metal cutlery is employed for eating directly out of the food receptacle. Consequently, the state of the art has changed in that food receptacles of that type are provided for the protection of the inner container, with a plastic material insert or liner positioned against its inner wall and protecting the insert. Receptacles of that type are known, for example, from German Published Patent Application No. 12 12 696 and German Petty Patent No. 73 31 929.

Since the sensitive inner container between the shell member and the liner or insert must be maintained as close as possible and dependably enclosed, and supported, care in manufacturing is required in order to effectuate this retaining enclosure. Thus in the second above-mentioned publication pertaining to the state of the technology, a partial unitary structure is proposed between the internal insert and the shell member, which leads to a relatively complex and prohibitively expensive injection molded plastic material element. In the first-mentioned publication setting forth the state of the art, for the connection between the internal insert and the shell member there is proposed a welding or glueing which is complex from a manufacturing standpoint and requires excessive care during mass production.

A corresponding manufacturing problem exists in the receptacle closure. This component which, in general, is formed as a threaded closure, and carries a grip for food receptacles, must support a sealing element which will satisfactorily sealingly close off the inner opening of the food receptacle.

SUMMARY OF THE INVENTION

Accordingly, it is an object of the present invention to so constructively configure the individual components which receive the inner container that they can be assembled without additional technological operating elements or arrangements into the finished food receptacle.

The foregoing oject is achieved in a food receptacle of the above-mentioned type in an inventive manner wherein, with the exception of the inner container, all components are plastic material elements and in which the shell component is rigidly connected with the internal insert, as well as, respectively, the cover portion with the sealing element of the receptacle closure, by means of latching constructions. Suitably, each of the latching constructions consist of a combined rotary latching and axial tension latching, whose particularly suitable construction is described hereinbelow.

Achieved hereby from a manufacturing standpoint is that the food receptacle can be assembled without additional operating or auxiliary aids in a continuous conveyor operation as a mass-produced article. Hereby, without any further measures there can be selectively assembled food receptacles constituted of differently colored plastic material components. The manufacturing requirement for the individual components which at first appears to be somewhat greater due to the formation of the latching construction, is insignificant since the injection molding form for the large number of the plastic material individual components which are to be prefabricated need only be prepared a single time.

The production of food receptacles of that type is further simplified when, in a suitable construction of the invention, the shell component and the base portion of the shell member are integrally constructed. When on the internal side of the base portion there are found integral upstanding resilient connectors which support the inner container, then for the closing in of the inner container during assembly there must hereby be provided the interconnection by latching between the internal insert or liner and the shell member whereby, even for large tolerance differences which cannot be avoided in the size of the inner container, whose rigid support is effected over a broad range of yielding upstanding connectors.

BRIEF DESCRIPTION OF THE DRAWINGS

Exemplary embodiments of the invention are now described in detail, taken in conjunction with the accompanying drawings; in which.

DETAILED DESCRIPTION

Figure 1:
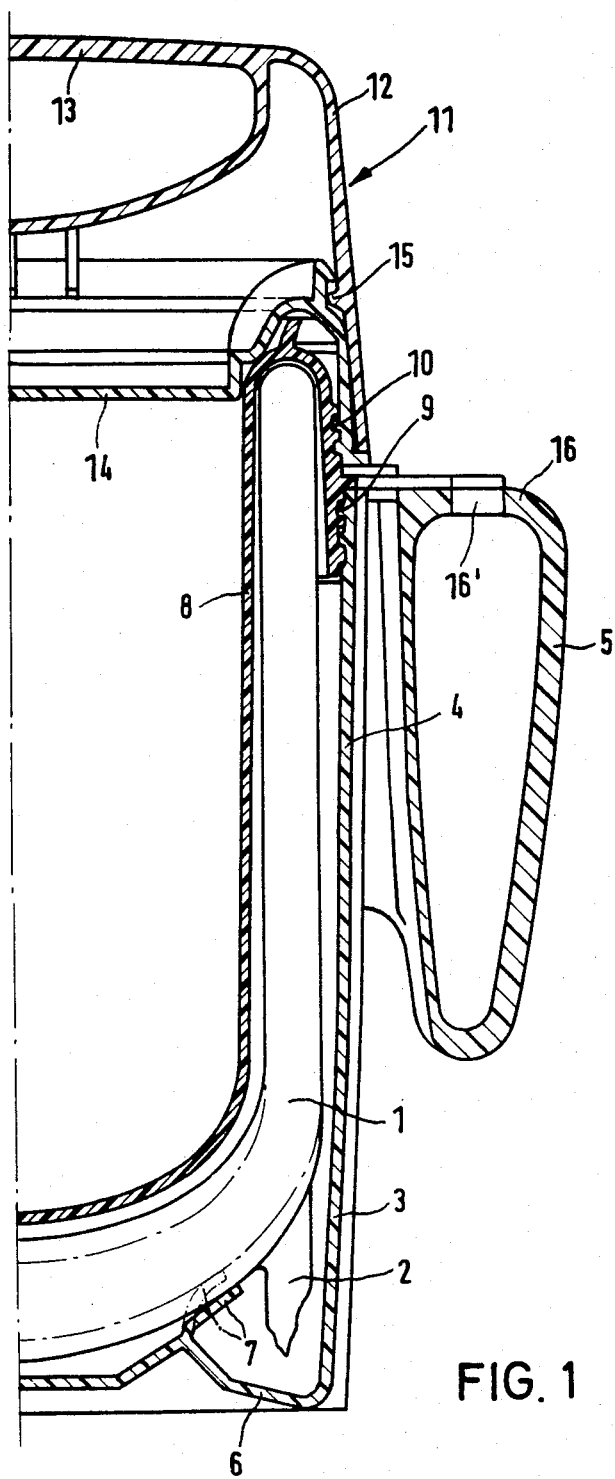
FIG. 1 illustrates a half-section through an inventive food receptacle.
Figure 2:
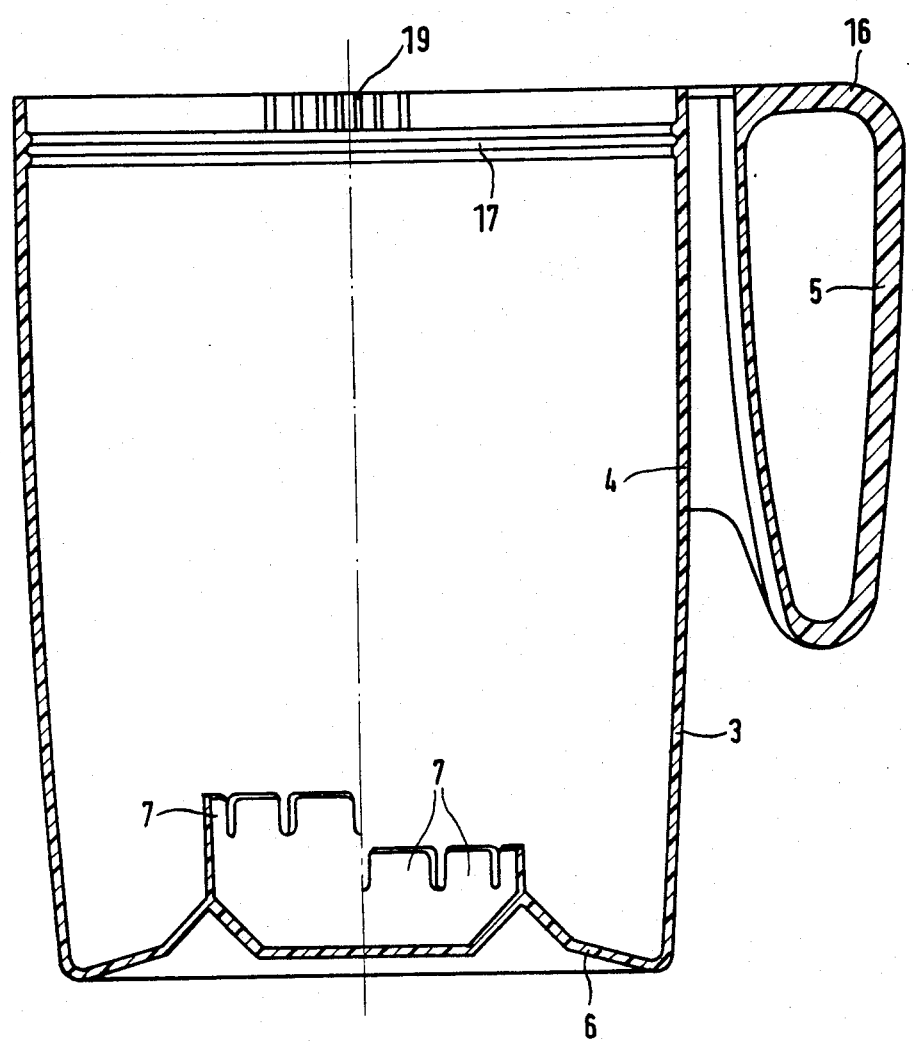
FIG. 2 is a sectional view through the shell member.
Figure 3:
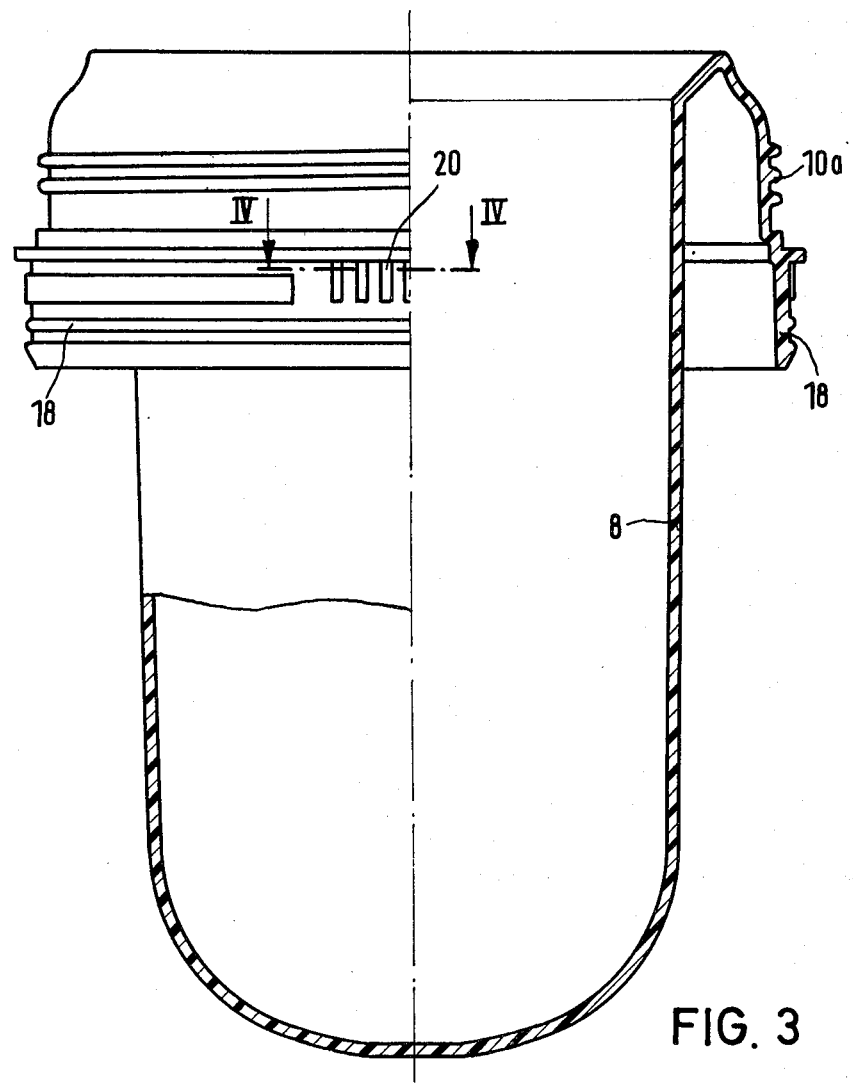
FIG. 3 is a plan view, partly in section, of the internal insert or liner.
Figure 4:
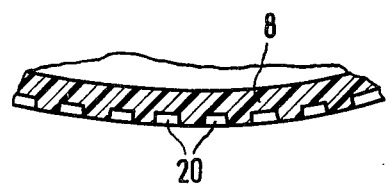
FIG. 4 is a fragmentary sectional view taken along line 4—4 in FIG. 3.

According to FIG. 1 the food receptacle consists of a heat-insulating inner container 1 which, for example, comprises a double-walled evacuated glass receptacle. The thereto melted evacuating connector is designated by reference numeral 2. The inner container 1 is encompassed by a shell member 3 which consists of a shell portion 4 with a carrying grip 5 on the side thereof, and a base portion 6. Projecting from the inner side of the base portion 6 are resilient connectors 7 which pursuant to FIG. 2, are annularly arranged, such as flower-petal like, and which support the inner container 1. Indicated in FIG. 1 through phantom lines is a second size for the inner container lying within tolerance, wherein the resilient connectors 7 then also assume the phantom-line illustrated position. Within the inner container 1 there is arranged an insert or liner 8 which through a latching construction generally identified by reference numeral 9, is interconnected with the shell member 3. In the illustrated embodiment the insert 8 extends outwardly over the upper edge of the inner container 1 and on the outside includes a screw threading 10(a) onto which there can be threaded a receptacle closure having internal threads 10(b) generally designated by reference numeral 11. The receptacle closure 11 consists of a cover portion 12 with a carrying grip 13, in which there is inserted a sealing element 14 over a latching construction generally designated by 15. The sealing element 14, in the screwed on condition of the receptacle closure 11, sealingly closes the upper opening of the insert with the inner container. The carrying grip 5 on the outside of the shell portion of 4 evidences an aperture 16' in its upper connector 16 into which there can be inserted a cutlery member. For closer elucidation of the first latch means 9 and the second latch means 15, reference is made to FIGS. 2 to 7. Each latching construction consists of a combined rotary latching and an axial tension latching. As the axial tension latching of the first latch means or latching construction 9, pursuant to FIG. 2 there are provided on the inside of the shell component 4 of the shell member 3 projecting circumferential connectors 17 which in the assembled condition coact with circumferential connectors 18 on the insert 8, according to FIG. 3 to define the axial latch components. As a rotary latching arrangement there is provided along the inner cylindrical shell component 4 a plurality of projecting axially extending connectors 19, which engage into recesses 20 pursuant to FIGS. 3 and 4 at the interconnection of the circumferential connectors 17, 18 to define the radial latch components.

Figure 5:
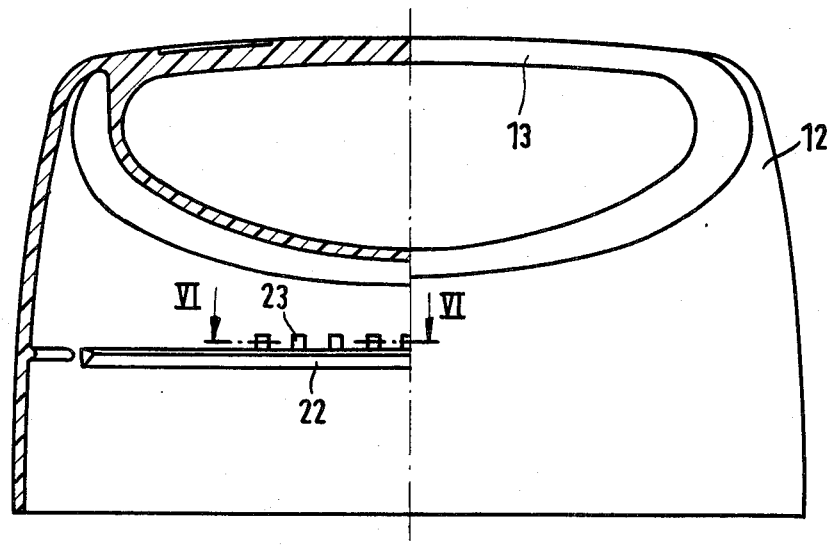
FIG. 5 is a plan view, partly in section, of the cover portion.
Figure 6:
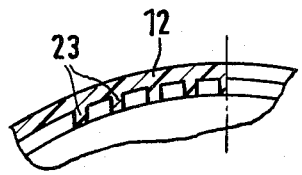
FIG. 6 is a section taken along line 6—6 in FIG. 5.
Figure 7:
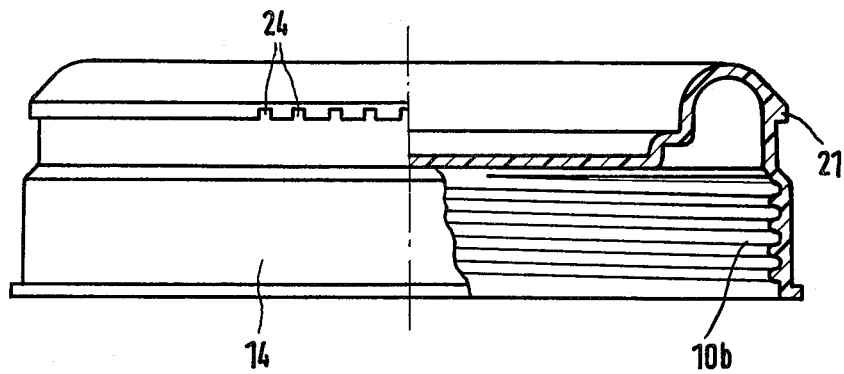
FIG. 7 is a plan view, partly in section, of the sealing element.

The axial tension latching of the second latch means or latching construction 15 between the cover member 12 and the sealing member 14, pursuant to FIGS. 5 and 7 consists of a connector 21 which projects in the circumferential direction, which can extend along the entire circumference or only partly about the circumference, whereby the connector 21 snaps in behind the projections 22 of the cover portion 12 distributed about the inner circumference to define an axial latch component. Provided along the inner wall of the cover portion 12 are projection connectors 23 acting as a rotary latching or radial latch components which engage into recesses 24 along the circumference of the sealing element 14.

The axial tension latching members 20 and 23 thereby prevent rotation of insert 8 with respect to shell 4, and cover 11 with respect to sealing element 14. Simultaneously, circumferential connectors 18 and 21 prevent any axial displacement of the connection. Once engaged, latching connections 9 and 15 rigidly interconnect in both axial and circumferential directions the shell 4 to insert 8, and the cover 12 with the sealing element 14. A permanent rigid interconnection is formed when the respective members are snapped together.

The latching construction 9, which consists of the circumferential webs 17 and 18, provides permanent engagement of the parts 4 and 8. The latching construction 15, which consists of the rib 21 and the projection 22, serves to secure parts 12 and 14, which together form the receptacle closure 11. The receptacle closure 11 is engaged by means of the thread 10 with the corresponding thread of part 8 to close or open the receptacle. There are no functioning relationships between the latching constructions 9 and 15. Each of latching constructions 9 and 15 fulfills its own separate connecting function between fully separate parts.

The radial latch components 20 and 23 thereby preventing rotation of insert 8 with respect to shell 4, and cover 11 with respect to sealing member 14. Simultaneously, circumferential connectors 18 and 21 prevent any axial displacement of the connections. Once engaged, first and second latch means 9 and 15 rigidly interconnect in both axial and circumferential directions the shell 4 to insert 8 and the cover 12 to the sealing element 14. A permanent rigid interconnection is formed when the respective members are snapped together.

What is claimed is:

1. An insulated food receptacle, said receptacle comprising:
   (a) a heat insulating inner container
   (b) an outer shell member encompassing and supporting the inner container, said outer shell including an upper shell portion and a base portion supporting the inner container from below,
   (c) an insert cladding the inner container, said insert extending over the upper rim of the inner container to enclose the latter when joined to the outer shell,
   (d) a first latch means for permanently securing the insert to the shell member, said latch means having both axial and radial components defined between the insert and the shell,
   (e) a cover member,
   (f) a sealing member for sealing the upper opening of the insert,
   (g) a second latch means for permanently securing the cover to the sealing member, said latch means having both axial and radial components defined between the cover and the sealing member,
   (h) a means for threadably engaging said sealing member to said insert, whereby the container may be closed and sealed by rotating the cover to threadably engage the insert.

2. An insulated food receptacle as claimed in claim 1, wherein the configuration of the cover member matches the configuration of the outer shell member.

3. An insulated food receptacle as claimed in claim 1, wherein said first latch means between the insert and the shell member further comprises upstanding circumferential connectors for the axial components, with said radial components further comprising axially extending and radially projecting latching connectors over at least a portion of the circumference of the oppositely located cylindrical regions of the shell member and the insert, said projecting latching connectors engaging recesses formed in corresponding regions in the insert and shell member.

4. An insulated food receptacle as claimed in claim 1, wherein said second latch means between the cover member and the sealing member further comprises upstanding connectors extending over at least a portion of the circumference of oppositely located regions of the cover member and said sealing member in the circumferential direction, said upstanding connectors axially engaging corresponding projections in a sealing member and cover member.

5. An insulated food receptacle as claimed in claim 1, wherein said upper shell portion and the base portion of the outer shell member are a unitary structure.

6. An insulated food receptacle as claimed in claim 5, which further comprises integrally formed, upstanding resilient connectors being arranged along the inside of the base portion for supporting the inner container.

7. An insulated food receptacle as claimed in claim 6, wherein said plurality of connectors are annularly arranged and projecting approximately in petal-leaf form.

8. An insulated food receptacle as claimed in claim 1, which further comprises a carrying grip on the outside of said shell member, said carrying grip having a generally horizontal upper connecting portion, and an aperture formed therein for receiving a cutlery element.

* * * * *